United States Patent
Kameta et al.

(10) Patent No.: US 9,910,421 B2
(45) Date of Patent: Mar. 6, 2018

(54) CONTROL DEVICE FOR MACHINE TOOL HAVING A PLURALITY OF AXES

(71) Applicant: FANUC CORPORATION, Minamitsuru-gun, Yamanashi (JP)

(72) Inventors: Kouki Kameta, Yamanashi (JP); Naoto Sonoda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/265,930

(22) Filed: Sep. 15, 2016

(65) Prior Publication Data

US 2017/0075337 A1    Mar. 16, 2017

(30) Foreign Application Priority Data

Sep. 16, 2015 (JP) ................................. 2015-183045

(51) Int. Cl.
  *B23Q 15/013*    (2006.01)
  *B23Q 15/12*     (2006.01)
  (Continued)

(52) U.S. Cl.
  CPC ........... *G05B 19/35* (2013.01); *G05B 19/402* (2013.01); *G05B 2219/34015* (2013.01); *G05B 2219/41015* (2013.01)

(58) Field of Classification Search
  USPC ................................................. 318/575, 590
  See application file for complete search history.

(56) References Cited

U.S. PATENT DOCUMENTS 5,042,126 A * 8/1991 Simonin ................... B23B 9/00
                                                29/38 B
7,183,739 B2 * 2/2007 Iwashita ................... H02P 5/52
                                                318/560

(Continued)

FOREIGN PATENT DOCUMENTS

JP    2001150201 A    6/2001
JP    2002126907 A    5/2002

(Continued)

OTHER PUBLICATIONS

Notification of Reasons for Refusal for Japanese Application No. 2015-183045, dated Oct. 19, 2017, including English language translation, 6 pages.

*Primary Examiner* — Bentsu Ro
(74) *Attorney, Agent, or Firm* — RatnerPrestia

(57) ABSTRACT

A control device for a machine tool for cutting a rotationally-symmetric workpiece by a tool, includes a machining command making unit for making a machining command for an auxiliary motor based on rotation speeds of the workpiece and the tool, and feed rates of the tool and the workpiece, an oscillation command making unit for making an oscillation command for the auxiliary motor, based on the rotation speeds and the feed rates, so that the oscillation command is asynchronous with the rotation speed of the workpiece around the axis of rotation, and so that the tool intermittently cuts the workpiece, an addition unit for adding the oscillation command to the machining command, and a control unit for controlling the auxiliary motor based on the machining command to which the oscillation command has been added.

5 Claims, 5 Drawing Sheets

(51) Int. Cl.
*B23B 1/00* (2006.01)
*G05B 19/35* (2006.01)
*G05B 19/402* (2006.01)

(56) References Cited

U.S. PATENT DOCUMENTS

| | | | | |
|---|---|---|---|---|
| 8,098,038 | B2* | 1/2012 | Okita | G05B 19/19 |
| | | | | 318/39 |
| 9,622,201 | B2* | 4/2017 | Idei | G05B 19/416 |
| 2007/0205738 | A1 | 9/2007 | Iwashita et al. | |
| 2014/0102268 | A1 | 4/2014 | Hariki et al. | |
| 2016/0266567 | A1 | 9/2016 | Watanabe et al. | |

FOREIGN PATENT DOCUMENTS

| | | | |
|---|---|---|---|
| JP | 2007206857 | A | 8/2007 |
| JP | 5033929 | B | 9/2012 |
| JP | 5139592 | B | 2/2013 |
| JP | 2013103279 | A | 5/2013 |
| JP | 5745710 | B1 | 7/2015 |

\* cited by examiner

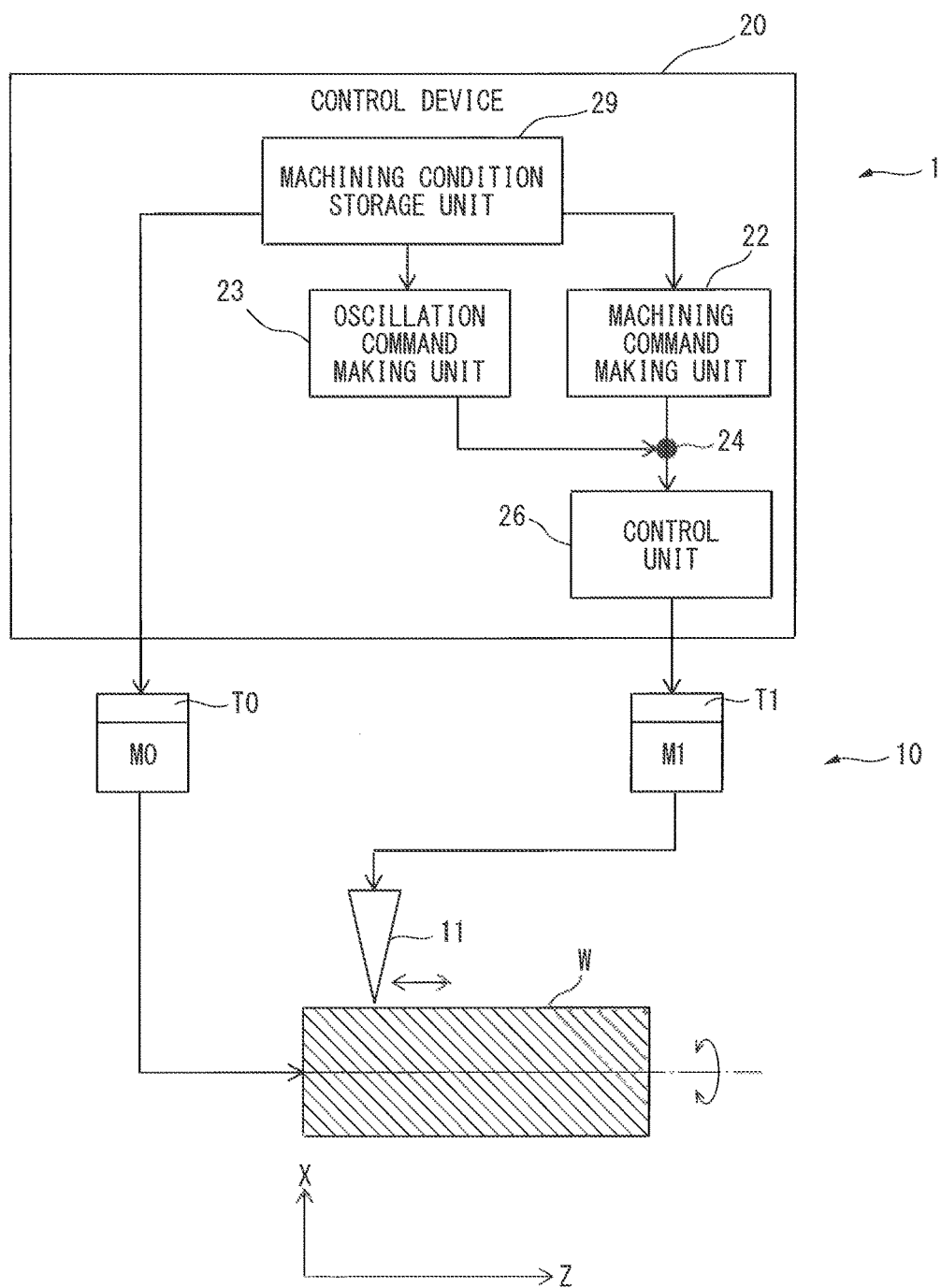

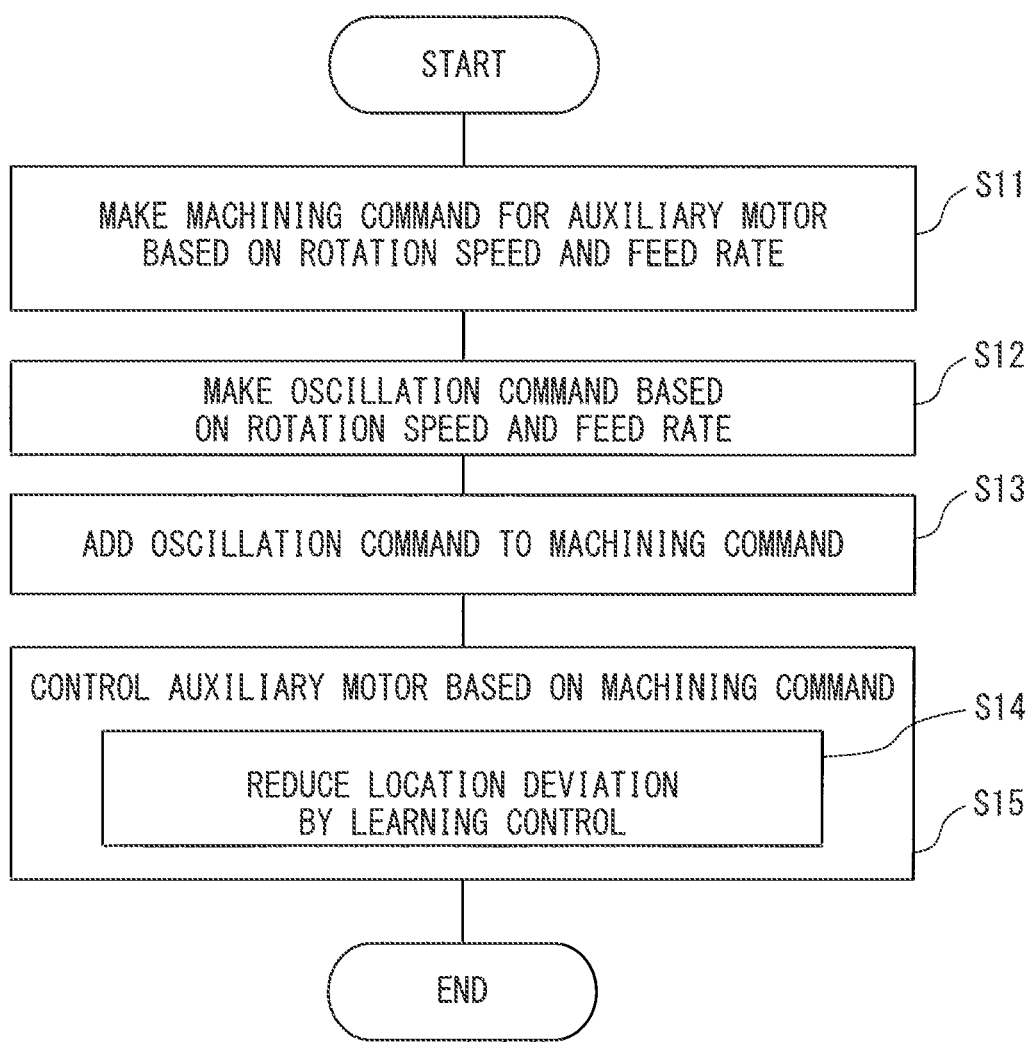

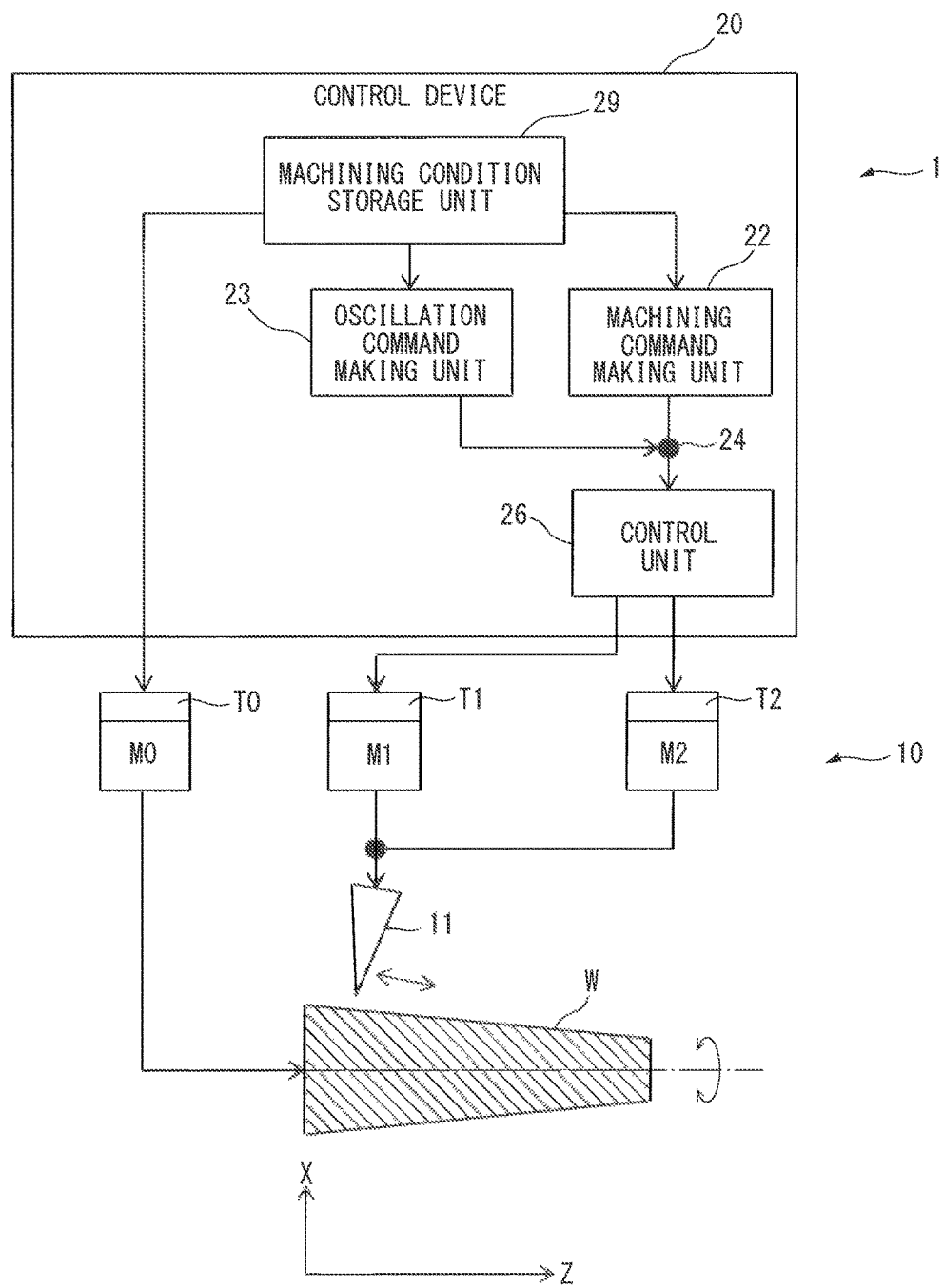

CONTROL DEVICE FOR MACHINE TOOL HAVING A PLURALITY OF AXES

BACKGROUND OF THE INVENTION

1. Field of the Invention

The present invention relates to a control device for a machine tool for cutting a workpiece in cooperation with a plurality of axes. In particular, the present invention relates to a control device for a machine tool for cutting the outer peripheral surface or the inner peripheral surface of a rotationally-symmetric workpiece by a tool.

2. Description of the Related Art

When a workpiece is machined by a tool of a machine tool, if chips are continuously generated, the chips may entwine with the tool. Therefore, it is necessary to stop the machine tool to remove the chips from the tool, significant time is required, and the production efficiency reduces. Further, the chips can damage the workpiece, and the quality of the workpiece may be reduced in some cases.

To avoid these defects, in conventional technologies, as disclosed in Japanese Patent No. 5033929 and Japanese Patent No. 5139592, vibration cutting, in which chips are minced, is introduced. In Japanese Patent No. 5033929 and Japanese Patent No. 5139592, a vibration cutting information table is prepared ahead of time, to perform the vibration cutting in accordance with the conditions described in the vibration cutting information table.

SUMMARY OF THE INVENTION

However, in conventional technologies, it is necessary to prepare the vibration cutting information table ahead of time. This is cumbersome and requires time.

The present invention was made in light of the circumstances described above and has an object to provide a control device for a machine tool, which can make shredding conditions for mincing chips based on machining conditions, in an actual cutting operation, without preparing a table.

To achieve the above object, according to a first aspect of the present invention, there is provided a control device for a machine tool for cutting an outer peripheral surface or an inner peripheral surface of a rotationally-symmetric workpiece by a tool. The control device includes a main motor for relatively rotating the workpiece and the tool around the axis of rotation of the workpiece, at least one auxiliary motor for relatively feeding the tool and the workpiece along a bus line of the outer peripheral surface or the inner peripheral surface of the workpiece, a machining command making unit for making a machining command for the at least one auxiliary motor based on rotation speeds of the workpiece and the tool, which relatively rotate, and feed rates of the tool and the workpiece, which are relatively fed, an oscillation command making unit for making an oscillation command for the at least one auxiliary motor based on the rotation speeds and the feed rates, so that the oscillation command is asynchronous with the rotation speed of the workpiece around the axis of rotation, and so that the tool intermittently cuts the workpiece, an addition unit for adding the oscillation command to the machining command, and a control unit for controlling the at least one auxiliary motor based on the machining command to which the oscillation command has been added. The control unit performs learning control based on the rotation speeds and an oscillation frequency of the oscillation command.

According to a second aspect of the present invention, in the control device according to the first aspect, the oscillation command making unit makes an oscillation frequency of the oscillation command, based on the rotation speeds, so that a half cycle phase shift occurs every time the workpiece or the tool rotates once, and makes an oscillation amplitude of the oscillation command based on the feed rates.

According to a third aspect of the present invention, in the control device according to the first or second aspect, the oscillation command making unit makes the oscillation frequency and the oscillation amplitude so that a torque of the at least one auxiliary motor does not exceed a predetermined value.

According to a fourth aspect of the present invention, in the control device according to any of the first to third aspects, the oscillation command making unit makes the oscillation frequency and the oscillation amplitude, based on a control frequency band of the learning control, so as to achieve learning convergence.

According to a fifth aspect of the present invention, in the control device according to any of the first to fourth aspects, the oscillation command making unit makes the oscillation frequency and the oscillation amplitude based on a desired length of a chip to be generated when the tool machines the workpiece.

These objects, features, and advantages of the present invention and other objects, features, and advantages will become clearer from the detailed description of typical embodiments illustrated in the appended drawings.

BRIEF DESCRIPTION OF THE DRAWINGS

FIG. 1 is a view of a system including a control device according to the present invention.

FIG. 2 is a flowchart of the operation of a control device according to the present invention.

FIG. 3 is a view of another system including a control device according to the present invention.

DETAILED DESCRIPTION

Figure 4A:
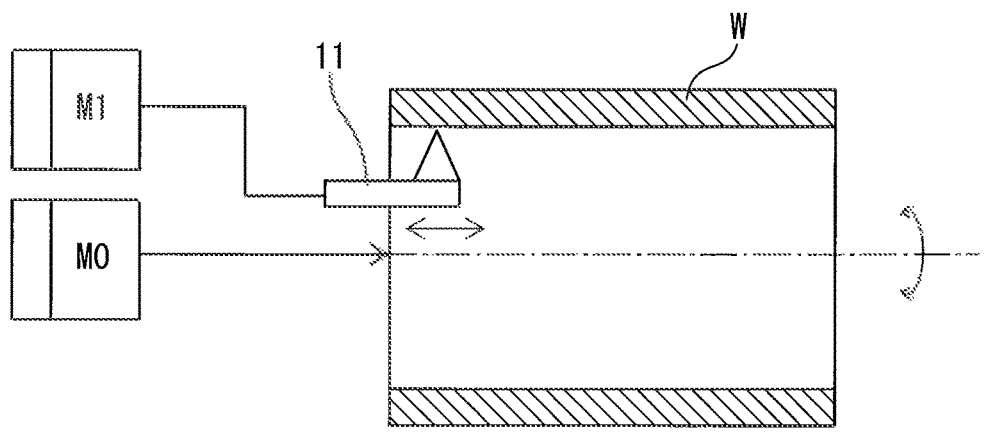
FIG. 4A is a view illustrating a cylindrical workpiece and a tool.

Embodiments of the present invention will be described below with reference to the accompanying drawings. In the following figures, similar members are designated with the same reference numerals. These figures are properly modified in scale to assist understanding thereof.

FIG. 1 is a view of a system including a control device according to the present invention. As shown in FIG. 1, a system 1 includes a machine tool 10 and a control device 20 for controlling the machine tool 10. The machine tool 10 has a tool 11. The tool 11 is used to cut the outer peripheral surface or the inner peripheral surface of a rotationally-symmetric workpiece W, for example, a cylindrical, conical, or truncated cone-shaped workpiece. In an example shown in FIG. 1, the tool 11 is used to cut the outer peripheral surface of a cylindrical workpiece W. Further, in FIG. 1 etc., the central axis of rotation of a workpiece is defined as Z-axis, and the axis perpendicular to the Z-axis is defined as X-axis.

FIG. 1 shows a cylindrical workpiece W. A main motor M0 of the machine tool 10 rotates the workpiece W around its central axis of rotation. Further, an auxiliary motor M1 of the machine tool 10 feeds the tool 11 along a bus line of the workpiece W. Note that, as will be described later, two or more auxiliary motors M1, M2, etc. may feed the tool 11 along the bus line of the workpiece W.

It is preferable that the main motor M0 and the auxiliary motors M1 and M2 are servo motors. The auxiliary motors M1 and M2 are used to feed, in cooperation with the main motor M0, the tool 11, to cut the workpiece W. Note that the torque necessary for the main motor M0 and the auxiliary motors M1 and M2 can be estimated from inertia and a designated angular speed if a cutting load is not taken into consideration. However, for example, detectors T0, T1, and T2 may be provided for the corresponding motors, to detect the torque.

The control device 20 is a digital computer, and has a machining condition storage unit 29 including machining conditions of the workpiece W. The machining conditions of the workpiece W include the rotation speed of the workpiece N and the feed rate of the tool 11. Further, the control device 20 includes a machining command making unit 22 for making a machining command for at least one auxiliary motor, for example, the auxiliary motor M1 based on rotation speeds of the workpiece N and the tool 11, which relatively rotate around their respective axes of rotation, and feed rates of. The tool 11 and the workpiece W, which are relatively fed.

The control device 20 also has an oscillation command making unit 23 for making an oscillation command for at least one auxiliary motor, for example, the auxiliary motor M1 so that the oscillation command is asynchronous with the rotation speed around the axis of rotation, and so that the tool 11 intermittently cuts the workpiece W, based on the aforementioned rotation speeds and feed rates. The oscillation command includes oscillation frequency and oscillation amplitude.

Note that intermittent cutting means that the tool 11 cuts the workpiece W while being alternately in contact with and separated from the workpiece W, and is also referred to as oscillation cutting or vibration cutting. In FIG. 1, the tool 11 oscillates with respect to the workpiece W that is rotating. However, the workpiece N may oscillate with respect to the tool 11 that is rotating in some embodiments.

Furthermore, the control device 20 includes an addition unit 24 for adding an oscillation command to the machining command, and a control unit 26 for controlling at least one auxiliary motor, for example, the auxiliary motor M1 based on the machining command to which the oscillation command has been added. As will be described the control unit 26 performs learning control based on the rotation speeds of the workpiece W and the tool 11 and the oscillation frequency of the oscillation command.

FIG. 2 is a flowchart of the operation of a control unit according to the present invention. First, in step S11 in FIG. 2, the machining command making unit 22 makes a machining command for the auxiliary motor M1 based on the rotation speed of the workpiece W and the feed rate of the tool 11, which are stored in the machining condition storage unit 29.

Furthermore, in step S12, the oscillation command making unit 23 makes an oscillation command based on the aforementioned rotation speeds and feed rates. In an example shown in FIG. 1, the tool 11 oscillates along only the axis of rotation, and accordingly, the oscillation command for only the auxiliary motor M1 is made.

FIG. 3 is a view of another system including a control device according to the present invention. In an example shown in FIG. 3, a truncated cone-shaped workpiece W is disposed. In this instance, the tool 11 oscillates, in an oblique direction, along the bus line of the workpiece W, to cut the outer peripheral surface of the workpiece W. The tool 11 moves in a synthetic direction of the X-direction and the Z-direction, and accordingly, two auxiliary motors M1 and M2 are necessary to move the tool 11. In this instance, in step S12, oscillation commands are produced for the two auxiliary motors M1 and M2. Note that the tool 11 may be fed by three or more auxiliary motors.

Further, FIG. 4A is a view of a cylindrical workpiece and a tool, which is different from FIG. 1. In FIG. 4A, the tool 11 machines the inner peripheral surface of the cylindrical workplace W. In this instance, only the auxiliary motor M1 is necessary, and in step S12, an oscillation command is made for only the auxiliary motor M1.

Figure 4B:
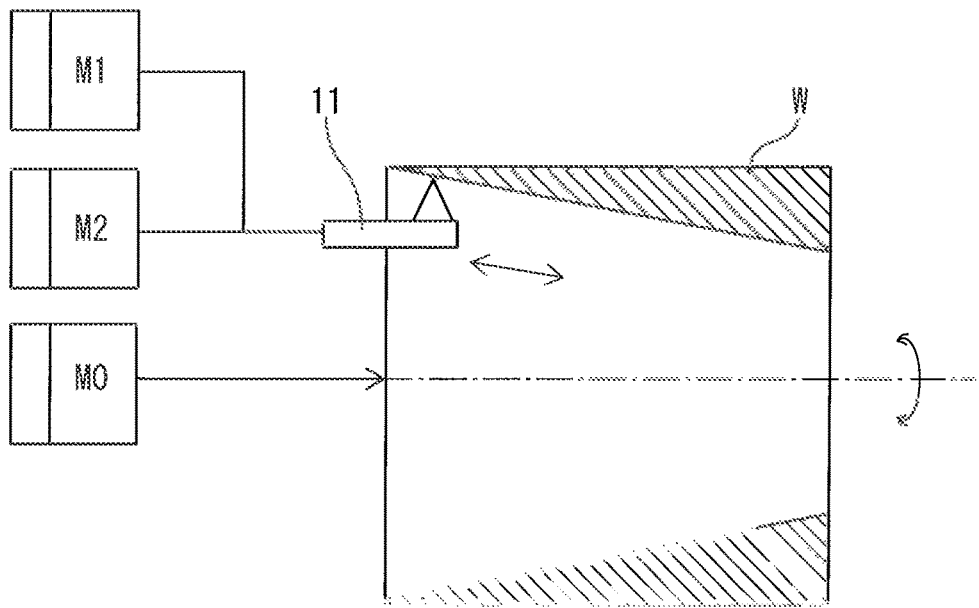
FIG. 4B is a view illustrating a truncated cone-shaped workpiece and a tool.

In contrast, FIG. 4B is a view of a truncated cone-shaped workpiece and a tool. In FIG. 4B, the tool 11 machines the inner peripheral surface of the truncated cone-shaped workpiece W. In this instance, as described above, two auxiliary motors M1 and M2 are necessary, and in step S12, oscillation commands are produced for the two auxiliary motors M1 and M2.

A case in which the tool 11 cuts the outer peripheral surface of the cylindrical workpiece W as described in FIG. 1 will be described below. Note that it will be understood, in the following description, that the same is generally true in FIGS. 3, 4A, and 4B.

Figure 5:
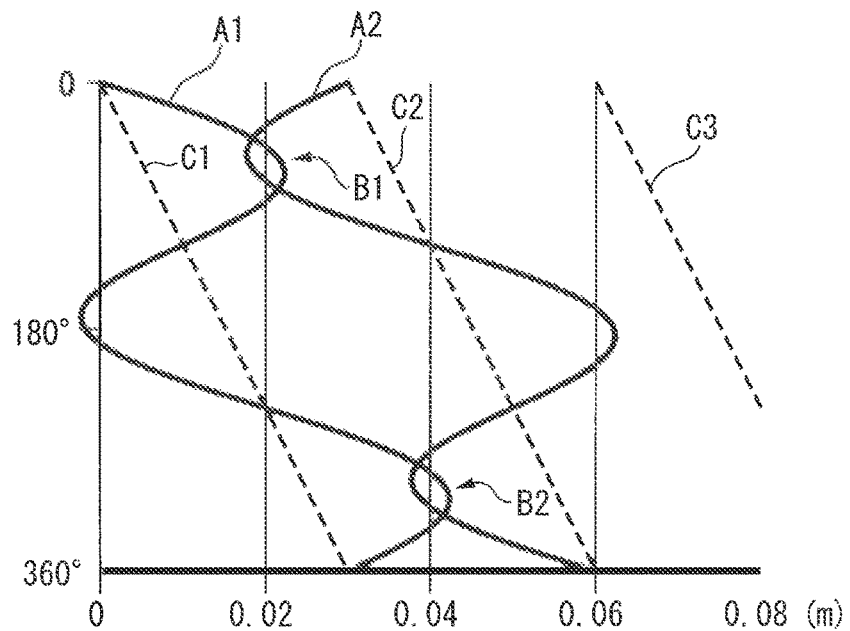
FIG. 5 is a view illustrating a relationship between feeding amount and rotation angle.

FIG. 5 is a view illustrating the relationship between feeding amount and rotation angle. The axis of abscissa in FIG. 5 corresponds to the central axis of rotation of the workpiece W, i.e., the Z-axis, and the axis of ordinate represents the rotation angle of the workpiece W. FIG. 5 shows a plurality of linear dashed lines C1, C2, C3, etc., which extend in an oblique direction. As can be seen from FIG. J, the abscissa of the intersection between the dashed line C1 and the axis of abscissa corresponds to the abscissa of the starting point of the subsequent dashed line C2. Likewise, the abscissa of the intersection between the dashed line C2 and the axis of abscissa corresponds to the abscissa of the starting point of the subsequent dashed line C3. Thus, it will be understood that these linear dashed lines C1, C2, C3, etc., represent the locus of the tool 11 on the workpiece N when the tool 11 does not receive an oscillation command.

Curved lines A1 and A2 shown in FIG. 5 represent the locus of the tool 11 on the workpiece W when the tool 11 receives an oscillation command. Note that the curved lines A1 and A2 for the tool are command values.

The curved line A1 in FIG. 5 represents the locus of the tool 11 in a first rotation of the workpiece W. The curved line A2 represents the locus or the tool 11 in a second rotation of the workpiece W. For the sake of shorthand, an illustration of the locus of the tool 11 in a third or later rotation of the workpiece N is omitted. These curved lines A1 and A2 are obtained by adding the feeding amount in the direction of the axis of abscissa to sine waves having the dashed lines C1 and C2 as reference axes. Thus, in the present invention, the oscillation command is asynchronous with the rotation speed.

In step S12 in FIG. 2, the oscillation command making unit 23 makes an oscillation command as will be described below. First, the oscillation command making unit 23 decides the dashed line-C1 based on the feed rate, and then decides the oscillation frequency of the sine wave having the dashed line C1 as the reference axis. In this instance, a predetermined value may be applied to the oscillation frequency. Note that the sine waves having the dashed lines C2 and C3 as the reference axes have the same oscillation frequency as the sine wave having the dashed line C1 as the reference axis.

As can be seen from FIG. 5, the sine wave having the dashed line C1 as the reference axis has no initial phase. In contrast, the sine wave having the dashed line C2 or later as the reference axis has an initial phase. It is preferable that, as shown in FIG. 5, the initial phase of the sine wave having a certain dashed line, for example, the dashed line C2 as the reference axis, is a half cycle (180 degrees) out of phase with the sine wave having the preceding dashed line, for example, the dashed line C1 as the reference axis. The reason is that, in the half cycle out of phase, the oscillation amplitude in the oscillation command can be minimized, and consequently, chips can be most efficiently minced. Note that the initial phase of the sine wave having the dashed line C2 as the reference axis may be a value other than 180 degrees.

Subsequently, the oscillation command making unit 23 decides the aforementioned amplitude (oscillation amplitude) of the sine wave. The curved line A1 and the curved line A2 in FIG. 5 overlap with each other at a portion B1, in which the rotation angle is 90 degrees, and a portion 52, in which the rotation angle is 270 degrees. As can be seen from FIG. 5, at the portions B1 and B2, the maximum value of the curved line A1 deviating from the dashed line C1 is larger than the minimum value of the curved line A2 deviating from the dashed line C2. In other words, the oscillation command making unit 23 decides the oscillation amplitude so that the curved line A1 and the subsequent curved line A2 partly overlap with each other. Note that the sine waves having the dashed lines C2 and C3 as the reference axes have the same oscillation frequency as the sine wave having the dashed line C1 as the reference axis.

In the overlapping portions B1 and B2, the tool 11 is separated from the workpiece W, and accordingly, does not machine the workpiece W. In the present invention, such overlapping portions periodically arise, and accordingly, so-called intermittent cutting can be performed. In an example shown in FIG. 5, the operation in accordance with the curved line A2 generates chips at the portions B1 and B2. Namely, two chips are generated in the curved line A2 in the second rotation. Further, in the present invention, such intermittent cutting is periodically performed, and accordingly, vibration cutting can be performed.

Note that a curved line A3 (not shown in FIG. 5) formed around the dashed line C3 has the same shape as the curved line A1. Accordingly, the curved line A2 and the curved line A3 overlap at a portion in which the rotation angle is 180 degrees, thus generating a chip at this portion. Thus, one chip is generated in the curved line A3 in a third rotation. Accordingly, two chips are generated at an even-number-th rotation, and one chip is generated at an odd-number-th rotation. However, no chip is generated at the first rotation.

Determining the oscillation frequency and the oscillation amplitude as described above causes the oscillation command making unit 23 to make an oscillation command (step S12). Subsequently, in step S13, the oscillation command is added to the machining command via the addition unit 24 shown in FIG. 1. Note that the curved lines A1 and A2 represent the machining command to which the oscillation command has been added.

Subsequently, in step S14 in FIG. 2, the control unit 26 controls the main motor M0 and the auxiliary motor M1 based on the machining command. Thus, in the present invention, it is not necessary to prepare a table for the oscillation cutting information ahead of time, unlike conventional technologies, and shredding conditions for chips can be decided based on the machining conditions of the workpiece W, before the workpiece W is actually cut.

Figure 6:
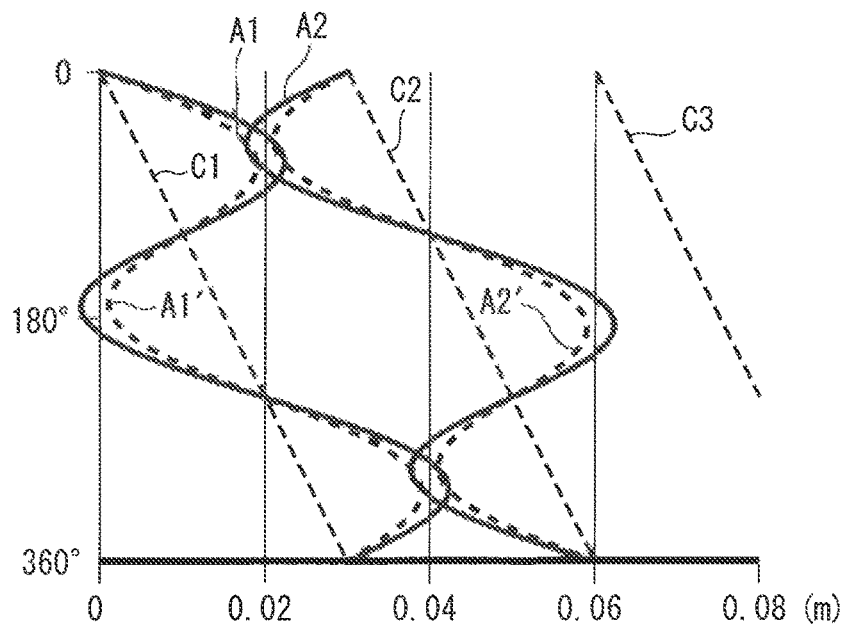
FIG. 6 is a view illustrating another relationship between feeding amount and rotation angle.

FIG. 6 is another view illustrating the relationship between feeding amount and rotation angle, which is similar to FIG. 5. FIG. 6 shows curved lines A1' and A2' representing an actual position, in addition to the curved lines A1 and A2 representing a command value. As shown in FIG. 6, even when the main motor M0 and the auxiliary motor M1 are driven based on the command values corresponding to the curved lines A1 and A2, the curved lines A1' and A2' representing an actual position may not perfectly follow the curved lines A1 and A2. In an example shown in FIG. 6, the curved lines A1 and A2 representing a command value are separated from the curved lines A1' and A2'. Accordingly, the intermittent cutting is not performed, and consequently, chips are not formed in a preferable manner.

Thus, in the present invention, as shown in step S15 in FIG. 2, learning control is used to improve a follow-up capability for the oscillation command. The learning control is a control system for improving the follow-up capability for "a cycle command in which a repetition pattern is fixed", and can reduce the location deviation as the cycle proceeds, for example, from a first cycle to a second cycle, from the second cycle to a third cycle, etc. Specifically, the location deviation in one cycle of the workpiece W and the tool 11 is learned and defined as a correction amount, and thus, is prevented from being periodically increased by the oscillation command. Note that the oscillation command is a target to be learned, and accordingly, the learning frequency band depends on the oscillation frequency of the oscillation command.

Consequently, the curved lines A1' and A2' representing an actual position gradually approach the curved lines A1 and A2 representing a command value, and finally, coincide with the curved lines A1 and A2 representing the command value. The curved lines A1 and A2 representing the command value have the portions B1 and B2, and accordingly, the intermittent cutting can be reliably performed, and chips can be reliably minced.

Further, the learning frequency band to perform the learning control has an upper limit, and when the upper limit is exceeded, learning convergence is not achieved, and the location deviation tends to remain. Consequently, chips are not formed in a preferable manner. Thus, in the present invention, the optimum oscillation frequency and oscillation amplitude should be obtained within the range in which the learning control can be performed.

Specifically, similar to a method for reducing torque, as will be described below, adjustment (elongation) of the length of a chip can reduce the oscillation frequency of the oscillation command so that the oscillation frequency remains within the learning frequency band. As a matter of course, the feed rate may be reduced if the machining conditions can be changed.

Further, in the present invention, the optimum oscillation frequency and oscillation amplitude are obtained, and accordingly, necessary torque can be minimized.

On the other hand, torque saturation would occur if the necessary torque can be minimized, and accordingly, should be avoided. Further, the learning control tends to increase torque, and accordingly, increase the possibility of torque saturation. Thus, in the present invention, the optimum oscillation frequency and oscillation amplitude should be obtained within the range in which the torque saturation does not occur.

Specifically, as will be described below, adjustment (elongation) of the length of a chip can reduce the oscillation frequency of the oscillation command and the necessary torque. As a matter of course, the feed rate may be reduced if the machining conditions can be changed.

It is preferable that the oscillation amplitude is as small as possible, and, when the oscillation frequency is low, a longer chip is formed. In this respect, a small torque is only required for the main motor M0 and the auxiliary motors M1 and M2. In contrast, when the oscillation frequency is high, the length of a chip is reduced, and the torque required for the main motor M0 and the auxiliary motors M1 and M2 increases.

When an operator wishes to obtain a chip having a desired length, the operator inputs the desired length of a chip to the oscillation command making unit 23. This causes the oscillation command making unit 23 to make the oscillation frequency and the oscillation amplitude based on the desired length of a chip. When, for example, a short chip is required, the workpiece W is prevented from being damaged. When a long chip is required, the torque and learning frequency band can be reduced to reduce a load applied to the tool 11 and to easily achieve the learning convergence.

EFFECT OF THE INVENTION

In the first aspect of the present invention, the oscillation frequency of the oscillation command is decided so that the oscillation command is asynchronous with the rotation speed of the workpiece around the axis of rotation, and the oscillation amplitude of the oscillation command is decided so that the tool can intermittently cut the workpiece. Further, motors are driven, based on the machining command to which the oscillation command has been added, to cut the workpiece. Further, learning control is applied, and accordingly, the follow-up property for the oscillation command can be improved. Thus, shredding conditions for mincing chips can be produced without preparing a table in an actual machining operation.

In the second aspect of the present invention, a half cycle phase shift occurs in the oscillation frequency of the oscillation command every time the workpiece or the tool rotates once, and accordingly, the oscillation amplitude can be minimized. Consequently, intermittent, cutting can be efficiently performed.

In the third aspect of the present invention, when at least one auxiliary motor is driven based on the machining command to which the oscillation command has been added, torque saturation of the motor can be prevented from occurring.

In the fourth aspect of the present invention, a further appropriate oscillation command can be obtained.

In the fifth aspect of the present invention, when a short chip is required, the workpiece can be prevented from being damaged. When a long chip is required, the torque can be reduced to reduce a load applied to the tool.

The present invention has been described above using exemplary embodiments. However, a person skilled in the art would understand that the aforementioned modifications and various other modifications, omissions, and additions can be made without departing from the scope of the present invention.

What is claimed is:

1. A control device for a machine tool for cutting an outer peripheral surface or an inner peripheral surface of a rotationally-symmetric workpiece by a tool, comprising:
   a main motor for relatively rotating the workpiece and the tool around the axis of rotation of the workpiece;
   at least one auxiliary motor for relatively feeding the tool and the workpiece along a bus line of the outer peripheral surface or the inner peripheral surface of the workpiece;
   a machining command making unit for making a machining command for the at least one auxiliary motor based on rotation speeds of the workpiece and the tool and feed rates of the tool and the workpiece;
   an oscillation command making unit for making an oscillation command for the at least one auxiliary motor, based on the rotation speeds and the feed rates, so that the oscillation command is asynchronous with the rotation speed of the workpiece around the axis of rotation, and so that the tool intermittently cuts the workpiece;
   an addition unit for adding the oscillation command to the machining command; and
   a control unit for controlling the at least one auxiliary motor based on the machining command to which the oscillation command has been added, wherein
   the control unit performs learning control based on the rotation speeds and an oscillation frequency of the oscillation command.

2. The control device according to claim 1, wherein the oscillation command making unit makes an oscillation frequency of the oscillation command, based on the rotation speeds, so that a half cycle phase shift occurs every time the workpiece or the tool rotates once, and makes an oscillation amplitude of the oscillation command based on the feed rates.

3. The control device according to claim 1, wherein the oscillation command making unit makes the oscillation frequency and the oscillation amplitude so that a torque of the at least one auxiliary motor does not exceed a predetermined value.

4. The control device according to claim 1, wherein the oscillation command making unit makes the oscillation frequency and the oscillation amplitude, based on a control frequency band of the learning control, so as to achieve learning convergence.

5. The control device according to claim 1, wherein the oscillation command making unit makes the oscillation frequency and the oscillation amplitude based on a desired length of a chip to be generated when the tool machines the workpiece.

* * * * *